United States Patent [19]
Kikuchi

[11] Patent Number: 5,143,435
[45] Date of Patent: Sep. 1, 1992

[54] ILLUMINATION SYSTEM FOR ENDOSCOPES

[75] Inventor: Akira Kikuchi, Kanagawa, Japan

[73] Assignee: Olympus Optical Co., Ltd., Tokyo, Japan

[21] Appl. No.: 591,806

[22] Filed: Oct. 2, 1990

[30] Foreign Application Priority Data

Oct. 2, 1989 [JP] Japan .................... 1-255175

[51] Int. Cl.$^5$ .............................................. F21V 7/04
[52] U.S. Cl. .................................. 362/32; 362/268;
  362/277; 362/318; 362/804; 128/6; 385/33
[58] Field of Search ............... 362/32, 268, 277, 280,
  362/319, 804, 318; 128/6, 397, 398; 350/96.18;
  385/33

[56] References Cited

U.S. PATENT DOCUMENTS

| | | | |
|---|---|---|---|
| 4,281,366 | 7/1981 | Wurster et al. | 362/32 |
| 4,483,585 | 11/1984 | Takami | 350/96.18 X |
| 4,721,359 | 1/1988 | Nishioka et al. | 350/96.18 X |
| 4,953,937 | 9/1990 | Kikuchi et al. | 362/335 X |

FOREIGN PATENT DOCUMENTS

1-144009  6/1989  Japan .

*Primary Examiner*—Stephen F. Husar
*Attorney, Agent, or Firm*—Cushman, Darby & Cushman

[57] ABSTRACT

An optical system for endoscopes comprising a light source and a condenser optical system for focusing the light emitted from said light source, and adapted so as to lead the light emitted from said light source to be incident through said condenser optical system onto light guides having different NA's, said condenser optical system being equipped with a means capable of varying or adjusting NA of the light emerging from said condenser optical system in conjunction with NA of a light guide selected for use. This optical system for endoscopes permits matching NA of the emerging light bundle with the NA of the selected light guide by using the adjusting means, thereby improving light distribution characteristic and transmission efficiency.

24 Claims, 10 Drawing Sheets

ILLUMINATION SYSTEM FOR ENDOSCOPES

BACKGROUND OF THE INVENTION a) Field of the invention

The present invention relates to an illumination system for endoscopes such as fiber scopes, non-flexible endoscopes and video endoscope.

b) Description of the prior art

Since endoscopes are inserted into body cavities, etc. for observing the interiors thereof, the locations to be observed through the endoscopes are normally in utter dark. It is therefore necessary to equip the endoscopes with illumination systems of their own.

Figure 18:
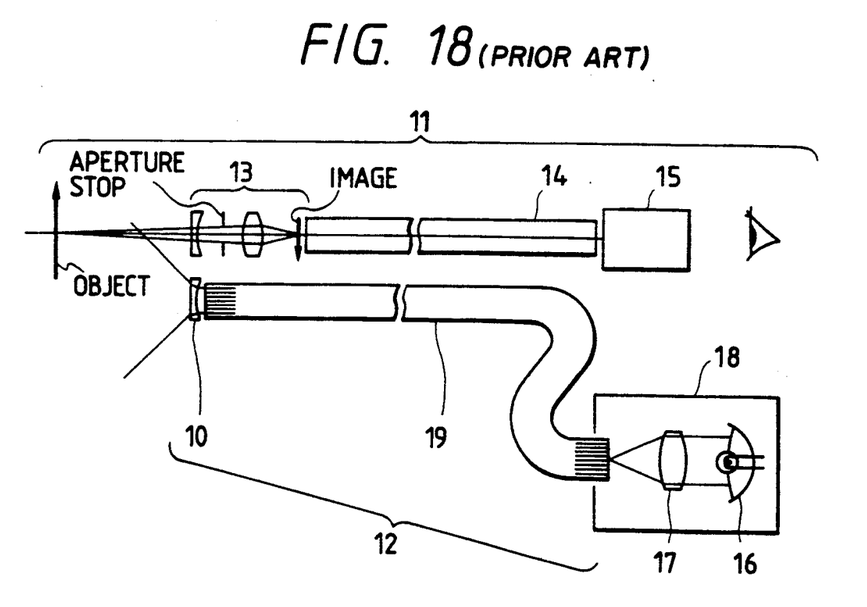
FIG. 18 shows a sectional view illustrating the configuration of the conventional endoscope.

An optical system of an ordinary endoscope is illustrated in FIG. 18 wherein a fiber scope is selected as an typical example. As shown in this drawing, the optical system of the endoscope is roughly divided into an observation optical system 11 and an illumination optical system 12. The observation optical system consists of an objective lens 13 which is disposed in the distal end of the endoscope for forming an image of an object, an image guide fiber bundle 14 for transmitting the image and an eyepiece optical system 15 for allowing observation of the image transmitted through the image guide fiber bundle 14. On the other hand, the illumination optical system 12 consists of a light source device 18 comprising a light source lamp 16 and a condenser lens 17, a light guide fiber bundle 19 for transmitting the light from the light source device 18 to the distal end of the endoscope and an illumination lens 10 for irradiating the object with the light emerging from the light guide fiber bundle 19.

In the recent years where endoscopes are needed in various fields of application for observing and inspecting interiors of body cavities, machines, etc., various types of endoscopes having different field angles, outside diameters, lengths, etc. are manufactured. Under this circumstance, a variety of illumination systems equipped with light guides made of optical fibers having different numerical apertures (NA's) are utilized.

Since the light guides having large NA's allow light bundles having large NA's to be incident thereon for transmission therethrough, these light guides can transmit large amounts of lights per unit sectional area thereof and have large distribution angles. However, since the optical fibers composing the light guides use, in the cores thereof, glass materials which have relatively large refractive indices and high degrees of pigmentation, they have a common tendency to tint the transmitted light yellowish, and this tendency is more remarkable as the light guides become longer.

On the other hand, light guides having small NA's does not allow lights having large NA's to be incident thereon for transmission therethrough, thereby transmitting small amounts of light per unit sectional area thereof and having small distribution angles. However, the light guides having small NA's permit using, in the cores of optical fibers, glass materials having relatively small refractive indices and transmit lights in conditions rather white as compared with those transmitted through the light guides having large NA's.

As a light source device using a light guide, there is known the light source device for endoscopes disclosed by Japanese Patent Kokai Publication No. Hei 1-144009. In this light source device, the light which is emitted from the light source optical system thereof and incident on the end surface of incidence of the light guide has an NA fixed at a unique level.

When the light emitted from a light source device has an NA fixed at a unique level, as in the above-mentioned conventional example, which optimized for a light guide having a large NA, it is possible to perform illumination effectively with the light guide by making use of the merits thereof, i.e., the wide distribution angle and the large amount of transmission light per unit sectional area thereof. In contrast, a light guide having a small NA will not transmit a light bundle having a large NA emitted from a light source device and cause loss of light amount.

Further, when a light bundle emitted from a light source has an NA fixed at a unique level which is optimized for a light guide having a small NA, it is possible, by using a light guide having a small NA, to obtain an illumination light closer to the white light without causing loss of light amount. If a light guide having a large NA is used with such a light bundle, however, the merit of the light guide to transmit a large amount of light per unit sectional area cannot be made use of, or the light will be transmitted in the amount substantially the same as that obtainable with a light guide having a small NA, and the illumination obtained will be tinted yellowish.

As is understood from the foregoing description, aptitudes, NA's and diameters of light bundles which are emitted from light source devices and incident on light guides are different dependently on NA's and sectional areas of light guides built in endoscopes.

SUMMARY OF THE INVENTION

A primary object of the present invention is to provide an illumination system for endoscopes which is capable of leading an illumination light bundles matched with characteristics of light guides used in endoscopes so as to be incident on said light guides.

Another object of the present invention is to provide an illumination system for endoscopes which is capable of varying NA of the light bundle emitted from a light source and focusing said light at a predetermined location.

A further object of the present invention is to provide an illumination system for endoscopes which is capable of varying the area to be irradiated with the light bundle emitted from a light source and focusing said light at a predetermined location.

The illumination system for endoscopes according to the present invention comprises a light source, a condenser optical system for condensing the light emitted from said light source onto a predetermined location, and a plurality of light guide fiber bundles having different NA's and arranged for receiving the light condensed by the condenser optical system, said optical system being equipped with a means for varying, in conjunction with NA of the light guide fiber bundle selected for use from among said light guide fiber bundles, NA of the light incident on said light guide fiber bundle from said condenser optical system.

Figure 1A:
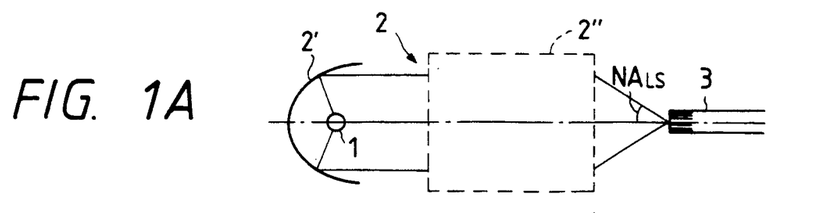
FIG. 1A and FIG. 1B show sectional views illustrating the fundamental composition of the illumination optical system for endoscopes according to the present invention.
Figure 1B:
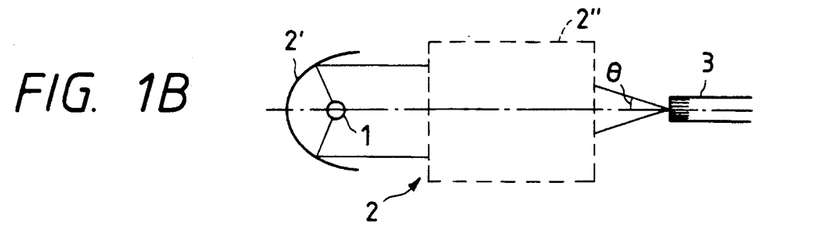

The principle of the illumination system according to the present invention is illustrated in FIG. 1A and FIG. 1B wherein only the light source for endoscopes, the end surface of incidence of the light guide fiber bundle and the surroundings thereof are shown, but the other components which are substantially the same as those of the conventional example are omitted. FIG. 1A shows a case where the light guide fiber bundle has a large NA, whereas FIG. 1B shows a case where the light guide fiber bundle has a small NA.

As seen from FIG. 1A and FIG. 1B, the illumination optical system consists of a light source lamp 1, a reflecting mirror 2', a condenser lens 2 and a light guide fiber bundle 3 (3') for receiving the light emerging from the condenser lens 2. The light bundle emerging from the condenser lens 2 has a large NA when the light guide fiber bundle 3 has a large NA as in the case shown in FIG. 1A, whereas the light bundle emerging from the condenser lens 2 has a small NA when the light guide fiber bundle 3' has a small NA as in the case shown in FIG. 1B. When a first endoscope comprising the light guide fiber bundle 3 and a second endoscope comprising the light guide fiber bundle 3' are used in combination with a single light source device, it is possible to adjust NA of the illumination light to an optimum value so as to use the illumination light without loss and perform illumination with favorable distribution characteristic by combining the first or second endoscope with the light source device.

Figure 2:
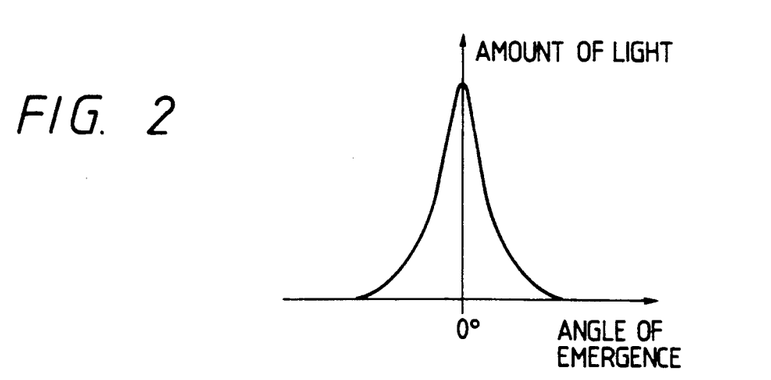
FIG. 2 shows a graph illustrating angular distribution of amount of the light emitted from a light source.

Most of the light source devices for endoscopes use xenon lamps, halogen lamps and metal halide lamps, which are generally integrated with reflecting mirrors and have glowing spots located at the focal points of the reflecting mirrors so that the reflected light bundles are parallel light bundles. The light bundle travelling forward from the light source has a diverging angle of a certain degree under the influences due to size of the glowing spot of the light source lamps 1 and the rays emitted directly from the glowing spot, thereby being distributed as represented by the curve illustrated in FIG. 2. Sufficient light amounts are obtainable, though variable dependently on types of light sources, within a range from 4° to 6° of distribution angles of the light bundles emitted from the light sources including the rays reflected by the reflecting mirrors.

Since restrictions are posed on outside diameters of endoscopes, it is necessary to increase amount of light to be transmitted per unit sectional areas of light guides. For this reason, NA's of light guides generally used in endoscopes, namely $NA_{LG}$, are mostly selected within the following range:

$$0.4 \leq NA_{LG} < 1 \quad (i)$$

In order to effectively use NA of the light guide, it is therefore necessary to arrange the condenser optical system 2 between the light source lamp 1 and the light guide 3. Further, it is desirable that NA of the light bundle emerging from the condenser optical system 2, namely $NA_{LS}$, is within the range defined by the following formula (ii) and that relationship between $NA_{LG}$ and $NA_{LS}$ is within the range defined by the following formula (iii):

$$0.4 \leq NA_{LS} < 1 \quad (ii)$$

$$0.6 \leq NA_{LS}/NA_{LG} \leq 1.5 \quad (iii)$$

If the ratio of $NA_{LS}$ relative to $NA_{LG}$ exceeds the lower limit of the formula (ii), the light guide will have an NA which is larger than required for the NA of the condenser optical system, whereby the illumination light will be tinted yellowish and amount of the light will not be increased. If the upper limit of the formula (iii) is exceeded, in contrast, the NA of the light source optical system will be far larger than that of the light guide, thereby increasing loss of light amount.

The illumination system for endoscopes according to the present invention is adapted in such a manner that $NA_{LS}$ is adjustable within the range defined by the formula (i) for the NA of the light guide by selecting $NA_{LS}$ and $NA_{LG}$ satisfying the relationship defined by the formula (iii) for the NA within said range.

Figure 3:
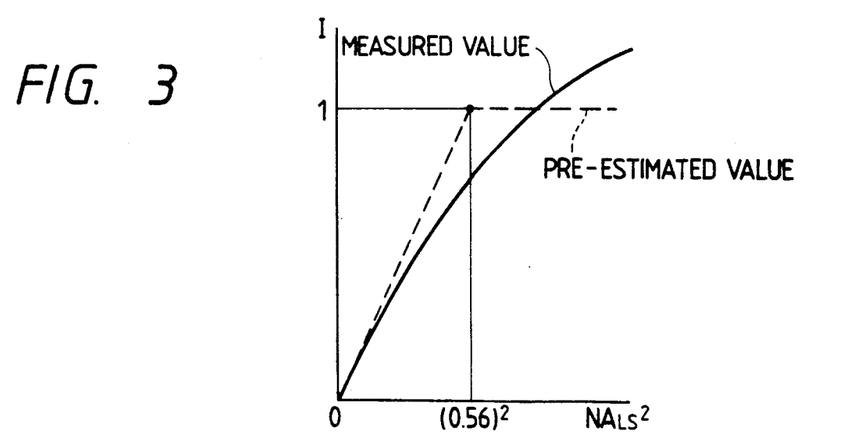
FIG. 3 shows a graph illustrating amount of light emerging from a light guide versus NA of incident light.

FIG. 3 shows a graph illustrating measured results of amounts I of the light emerging from a light guide when $NA_{LS}$ of the light incident on a light guide having $NA_{LG}$ of 0.56 is varied from 0 to 0.95.

Loss of amount of the light incident on the light guide is caused during transmission due to absorption by the core of the light guide, total reflection by the cladding, leakage from the cladding, etc.

In an ideal condition where the light guide does not allow the loss during transmission, amount of the light emerging from the light guide is proportional to square of the NA of the incident light. When skew rays are ignored in this condition, rays having NA's larger than 0.56 are not transmitted and increase of light amount is stopped at $NA_{LS}=0.56$. Though the increase of light amount actually continues at NA's larger than 0.56 due to contribution by the skew rays, increasing rate is lowered at larger NA's since the above-mentioned loss during transmission increases at the larger NA's. Further, within the region where NA's are small, transmission condition becomes closer to the ideal condition and transmission efficiency is enhanced as $NA_{LS}$ is smaller.

Zoom optical systems such as those shown in FIG. 4A, FIG. 4B, FIG. 5A and FIG. 5B are used as means for continuously varying NA of the light emerging from the condenser optical system.

Figure 4A:
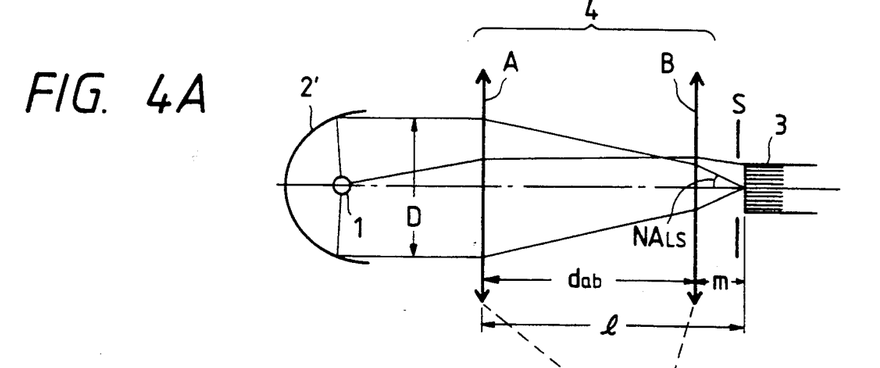
FIG. 4A, FIG. 4B, FIG. 5A, FIG. 5B, FIG. 6, FIG. 7A, FIG. 7B, FIG. 8A, FIG. 8B, FIG. 9A, FIG. 9B, FIG. 9C, FIG. 9D, FIG. 10A, FIG. 10B, FIG. 11A, FIG. 11B and FIG. 12 show diagrams illustrating means for varying or adjusting NA of the light emerging from the illumination optical system according to the present invention.
Figure 4B:
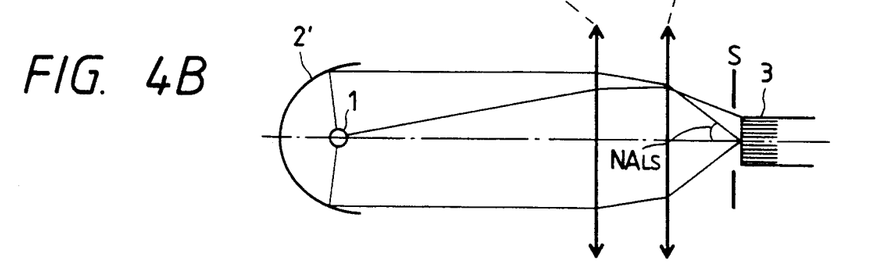

The zoom optical system shown in FIG. 4A and FIG. 4B consists of two lens units A and B having positive refractive powers respectively, and has a long focal length position shown in FIG. 4A and a short focal length position shown in FIG. 4B.

The light bundle emitted from the light source 1 is made nearly parallel by the reflecting mirror 2' and incident on the zoom optical system 4 in the conditions expressed by the following formulae (iv) and (v):

$$1/f_{ab} = \frac{1}{f_a} + \frac{1}{f_b} - \frac{d_{ab}}{f_a f_b} \quad (iv)$$

$$\frac{1}{m} - \frac{1}{(f_a - d_{ab})} = \frac{1}{f_b} \quad (v)$$

wherein the reference $f_a$ represents the focal length of the positive front lens unit A of the zoom optical system 4, the reference symbol $f_b$ designates the focal length of the positive rear lens unit B of the zoom optical system 4, the reference symbol $f_{ab}$ denotes the total focal length of the zoom optical system 4, the reference symbol $d_{ab}$ represents the distance between the principal point of the front lens unit A and that of the rear lens unit B, and the reference symbol m designates the distance as measured from the rear lens unit to the image point of the zoom optical system.

Further, from the above-mentioned formulae (iv) and (v), we obtain the following formulae (vi) and (vii):

$$m = f_{ab} \{1 - (d_{ab}/f_a)\} \quad (vi)$$

$$l = f_{ab}\left\{\left(1 - \frac{d_{ab}}{f_a}\right) + (d_{ab}/f_{ab})\right\} \quad \text{(vii)}$$

wherein the reference symbol l represents the distance as measured from the principal point of the front lens unit A to the image point of the zoom optical system.

Since it is possible to vary the focal length $f_{ab}$ without changing the location of the light guide 3 by varying the locations of the lens units according to the above-mentioned formulae (vi) and (vii), $NA_{LS}$ can be varied.

Figure 5A:
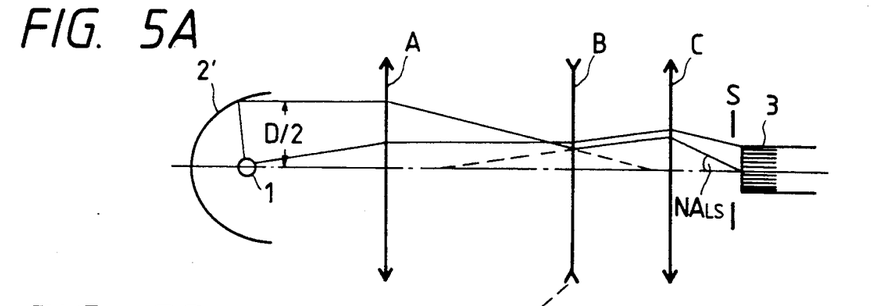
Figure 5B:
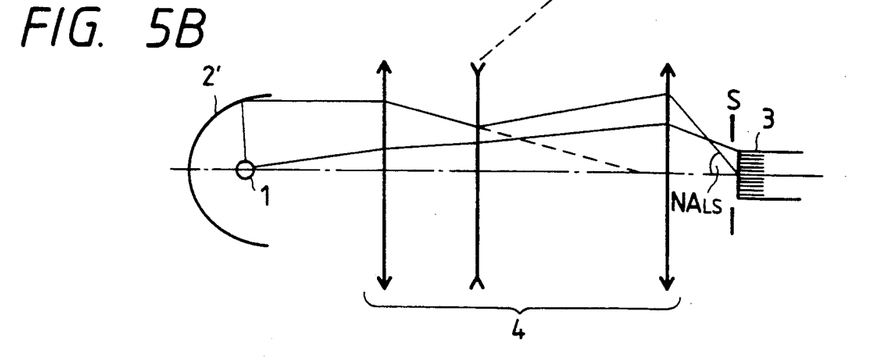

Further, the zoom optical system shown in FIG. 5A and FIG. 5B consists of three lens units, i.e., a lens unit A having a positive refractive power, a lens unit B having a negative refractive power and a lens unit C having a negative refractive power, and has a long focal length position shown in FIG. 5A and a short focal length position shown in FIG. 5B. The composition of the zoom optical system illustrated in FIG. 5A and FIG. 5B is similar to that of the zoom optical system shown in FIG. 4A and FIG. 4B in that the light bundle emitted from the light source 1 is made nearly parallel by the reflecting mirror 2' and incident on the optical system 4.

It is desirable that the zoom optical system shown in FIG. 4A and FIG. 4B or the zoom optical system shown in FIG. 5A and FIG. 5B satisfies the following conditions (viii) and (ix):

$$f_T/f_W \geq 1.1 \quad \text{(viii)}$$

$$0.4 \leq D/f_S \leq 1.0 \quad \text{(ix)}$$

wherein the reference symbol $f_T$ represents the focal length of the zoom optical system at the long focal length position thereof, the reference symbol $f_W$ designates the focal length of the zoom optical system at the short focal length position thereof, the reference symbol $f_S$ denotes the focal length of the zoom optical system at an optional position between the long focal length position and the short focal length position, and the reference symbol D represents the diameter of the light bundle emitted from the light source 1 in the condition where it is made nearly parallel by the reflecting mirror 2'.

The above-mentioned formula (viii) defines the zooming ratios of the zoom optical systems, i.e., variation ratios of NA's of the light bundles incident on the light guides, whereas the formula (ix) defines the ranges of $NA_{LS}$'s.

As is already described above, NA's of the light guides generally used in endoscopes, namely $NA_{LG}$'s, are mostly within the range defined by the formula (i). It is therefore necessary to select $NA_{LS}$'s matched with the values of $NA_{LG}$'s within the range defined by the formula (i).

If the above-described zoom optical systems do not satisfy the formulae (viii) or (ix), it will be difficult to satisfy the formulae (i) and (ii), whereby the light bundle emitted from the light source 1 can hardly be transmitted effectively through the light guide 3.

On the other hand, general endoscopes comprise automatically light adjusting mechanisms for maintaining adequate amounts of illumination lights regardless of differences in distance to objects. These light adjusting mechanisms function to measure brightness of objects, and adjust sizes of stop apertures arranged between the light source lamps and light guide fiber bundles on the basis of the measured data so as to obtain illumination lights having brightness adequate for photographing and monitoring on TV. For this purpose, the automatically light adjusting mechanisms must adjust amounts of lights so as not to vary NA's of the light bundles emitted from the light source optical systems, namely $NA_{LS}$'s, or not to vary light distribution. Accordingly, it is necessary to dispose the stops arranged in the light adjusting mechanisms at the location indicated by S shown in FIG. 4A, FIG. 4B, FIG. 5A and FIG. 5B, i.e., in the vicinity of the image point.

When the stops are arranged at the location S shown in FIG. 4A, FIG. 4B, FIG. 5A and FIG. 5B, however, diameter of the glowing spot is varied by changing focal lengths of the optical systems. It is therefore necessary to vary diameter of the glowing spot in conjunction with changes of the focal lengths of the light source optical systems by using automatic light adjusting mechanisms having more complicated structures.

Figure 6:
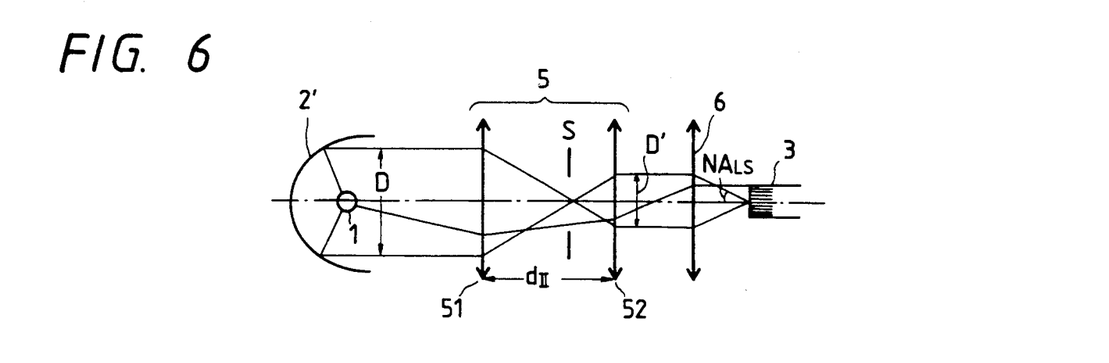

In order to simplify the structures of the automatically light adjusting mechanisms and design the condenser lens systems so as to have diameters smaller than those of the zoom optical systems illustrated in FIG. 4A, FIG. 4B and FIG. 5A and FIG. 5B, it is desirable to compose the light source optical system as illustrated in FIG. 6. This light source optical system consists of a first nearly afocal optical system 5 consisting of a pair of positive lens units 51 and 52 (a front lens unit 51 and a rear lens unit 52) arranged on both sides of a stop, and a second optical system 6 arranged thereafter, said lens unit 51 or said second optical system 6 comprising a vari-focal system. The vari-focal system can have such a concrete composition as that shown in FIG. 7A and FIG. 7B. In the example illustrated in FIG. 7A and FIG. 7B, the second optical system 6 is designed as a zoom lens system composed of two positive lens units which are similar to those shown in FIG. 4A and FIG. 4B. Different examples of the vari-focal system will be described later.

It is desirable that the light source optical system shown in FIG. 6 satisfies the following conditions (1) through (4):

(1) $0.8 \leq d_{II}/(f_{IIa} + f_{IIb}) \leq 1.2$
(2) $f_{II\ III\ T} \geq 1.1$
(3) $0.8 \leq (f_{IIb}/f_{IIa} \cdot f_{III}) \cdot D' < 2$
(4) $f_{III} \cdot NA_{LS}/D' \leq 0.5$ wherein the reference symbol $d_{II}$ represents the distance between the principal points of the lens units 51 and 52, the reference symbol $f_{IIa}$ designates the focal length of the lens unit 51, the reference symbol $f_{IIb}$ denotes the focal length of the lens unit 52, the reference symbol $f_{II\ III\ T}$ represents the focal length of an optical system composed of the first optical system and the second optical system at the long focal length position thereof, the reference symbol $f_{II\ III\ W}$ designates the focal length of the optical system composed of the first optical system and the second optical system at the short focal position thereof, the reference symbol $f_{III}$ denotes the focal length of the second optical system, and the reference symbol D' represents the diameter of the light bundle emerging from the condenser optical system.

The condition (1) defines that the first optical system is to be nearly afocal.

The condition (2) defines the vari-focal ratio of the second optical system. If the condition (2) is not satisfied or the vari-focal ratio is lower than 1.1, the variation of NA of the light bundle emitted from the light source optical system will be too small to obtain the effect for enhancing transmission efficiency of the light bundle.

When the first optical system is nearly afocal, there establishes the following formula:

$$D'/2 \approx (f_{IIb}/f_{IIa}) \cdot D/2$$

wherein the reference symbol $D'$ represents the diameter of the light bundle having passed through the first optical system.

Further, since $f_{III} \cdot NA_{LA} = D'/2$, $NA_{LS}$ is given by the following formula:

$$NA_{LS} = f_{IIb}/(f_{IIa} \cdot f_{III}) \cdot D/2$$

By using this formula in the above-mentioned formula (ii), we obtain the relationship shown below:

$$0.4 \leq f_{IIb}/(f_{IIa} \cdot f_{III}) \cdot D/2 < 1$$

The above-mentioned condition (3) is led from this relationship. That is to say, the condition (3) defines the focal length of a lens component or a lens unit which is required for satisfying the above-mentioned formula (ii). If the upper limit or the lower limit of the condition (3) is exceeded, the optical system will not be suited as a light source optical system for endoscopes or cannot correct the defects of the conventional examples.

The condition (4) restricts the diameter $D'$ of the light bundle to pass through the second optical system. That is to say, the reference symbol $f_{III} \cdot NA_{LS}$ represents the diameter of the light bundle to pass through the second optical system. If $f_{III} \cdot NA_{LS}$ exceeds the upper limit of the condition (4), the light bundle diameter $D'$ will be enlarged, thereby enlarging the outside diameter of the second optical system and the light source device accordingly.

As the vari-focal optical system to be used in the first and second optical systems described above, there are available the zoom optical systems shown in FIG. 7A, FIG. 7B, FIG. 8A and FIG. 8B, and the optical systems each having two focal lengths illustrated in FIG. 9A, FIG. 9B, FIG. 9C, FIG. 10A, FIG. 10B, FIG. 11A and FIG. 11B.

Figure 7A:
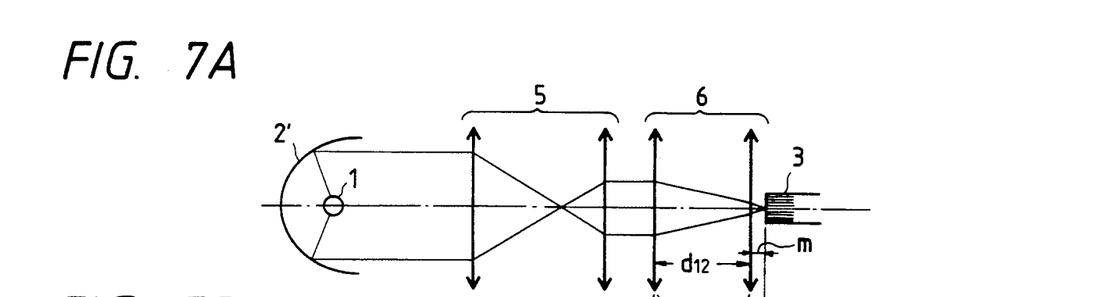
Figure 7B:
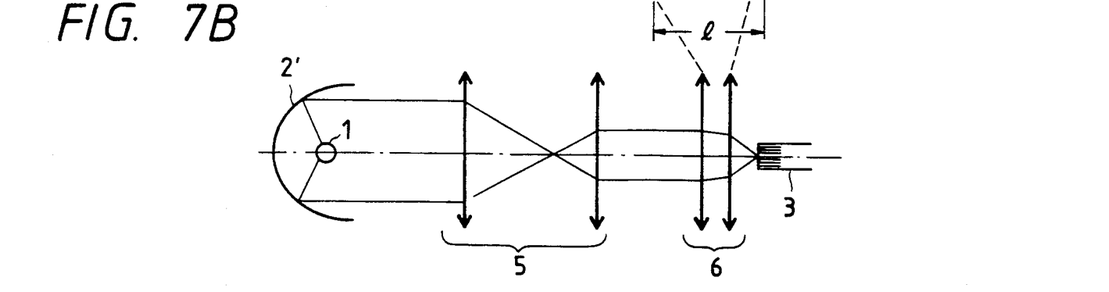

The light source optical system shown in FIG. 7A and FIG. 7B adopts a zoom optical system composed of the two lens units illustrated in FIG. 4 as the second optical system, and has a long focal length position shown in FIG. 7A and a short focal length position shown in FIG. 7B.

Figure 8A:
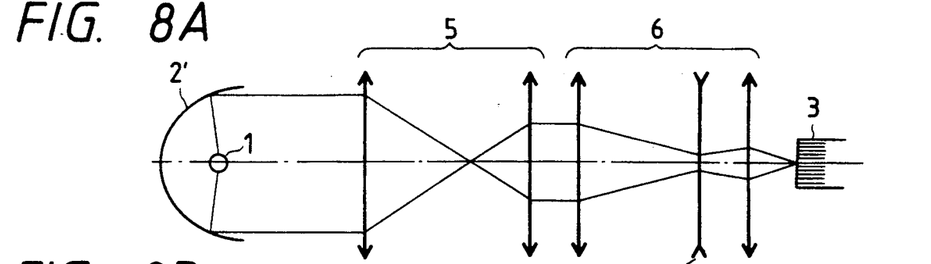
Figure 8B:
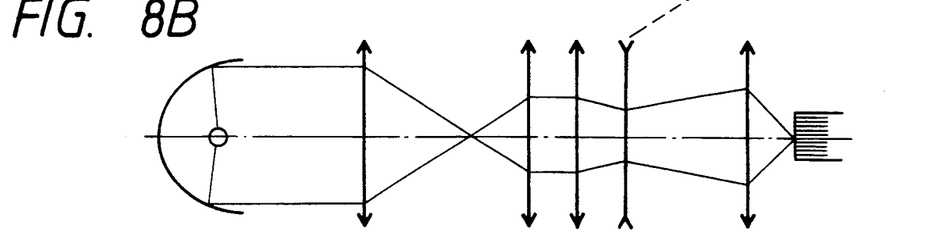

The light source optical system shown in FIG. 8A and FIG. 8B adopts a zoom optical system composed of the three lens units illustrated in FIG. 5 as the second optical system.

Figure 9A:
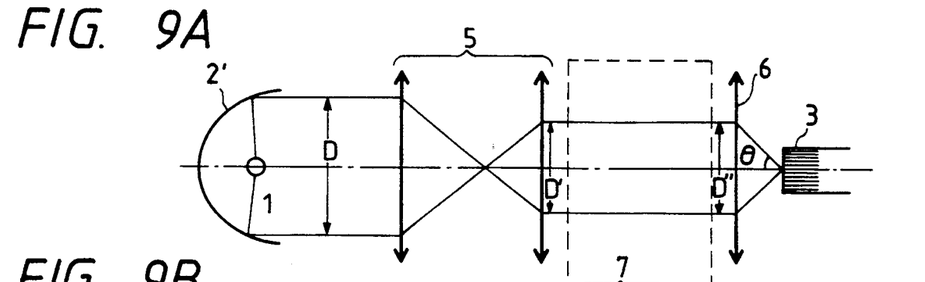

The light source optical system illustrated in FIG. 9A, FIG. 9B, FIG. 9C and FIG. 9D selectively uses afocal systems having various magnifications which are removably arranged between the first optical system and the second optical system. Out of these drawings, FIG. 9A shows the optical system in a condition where no afocal system is disposed between the first optical system and the second optical system. In the condition illustrated in FIG. 9B, the light source optical system comprises, between the first optical system 5 and the second optical system 6, an afocal system which is composed of a negative lens unit and a positive lens unit, and has a magnification $\beta_a$ higher than 1. In the condition shown in FIG. 9C, the light source optical system adopts an afocal system which is composed of a lens unit having a positive refractive power and a lens unit having a negative refractive power, and has a magnification $\beta_a$ lower than 1. In the condition illustrated in FIG. 9D, the light source optical system an afocal system which is composed of two lens units having positive refractive powers, and can have magnification $\beta_a$ larger or smaller than 1 dependently on selection of the refractive powers of the two lens units.

NA of the light bundle emerging from this light source optical system is given by the following formula:

$$D'' = \beta_a D' = \beta_a (f_{IIb}/f_{IIa}) \cdot D$$

$$f_{III} \sin \theta = D''/2$$

hence, $$\sin \theta = D''/2 f_{III} = (f_{IIb}/2 f_{IIa} \cdot f_{III}) \cdot \beta_a \cdot D$$

Figure 9B:
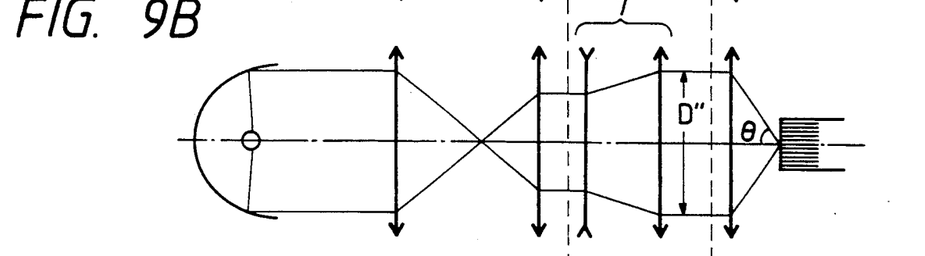
Figure 9C:
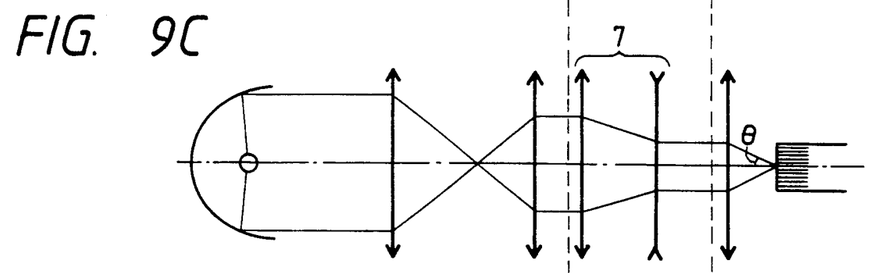
Figure 9D:
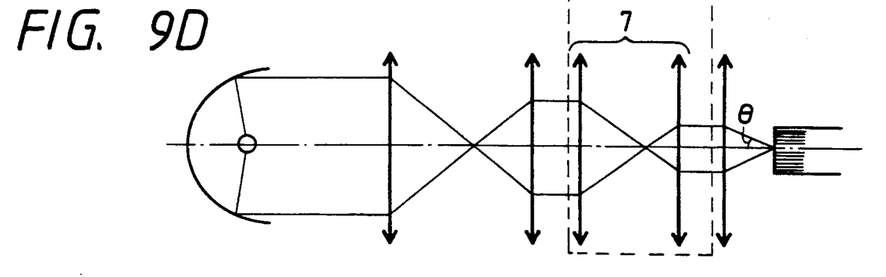

Each of the afocal systems shown in FIG. 9B, FIG. 9C and FIG. 9D can have a magnification of $1/\beta_a$ by replacing the location of the lens unit arranged on the side of the light source with that of the lens unit arranged on the side of the light guide. The vari-focal systems of this type are also applicable to light source optical systems which do not comprise the optical system 5 used for varying diameters of the light bundles.

Figure 10A:
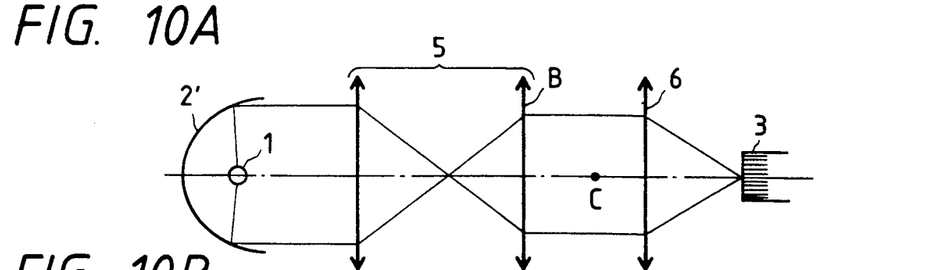
Figure 10B:
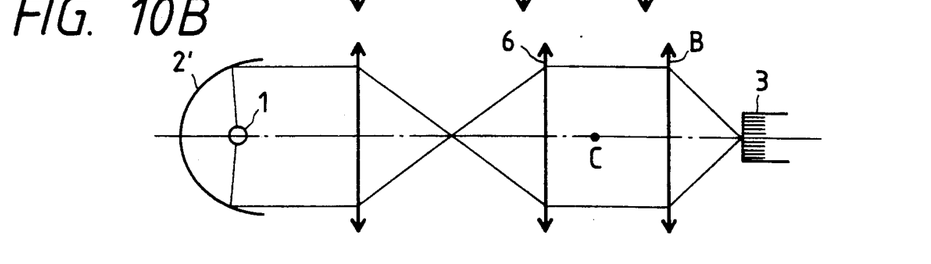

The light source optical system shown in FIG. 10A and FIG. 10B consists of a first optical system B and the second optical system 6, and composed so as to be reversible taking a point C as the rotating center. When total magnification of the light source optical system composed of the optical system B and the optical system 6 is represented by $\beta_{IIb\ III}$ and the location of the reversing center C is determined so that the light source optical system can have a total magnification of $1/\beta_{IIb\ III}$ it is possible to vary NA of the light bundle incident on the light guide without changing the location of the light guide.

Figure 11A:
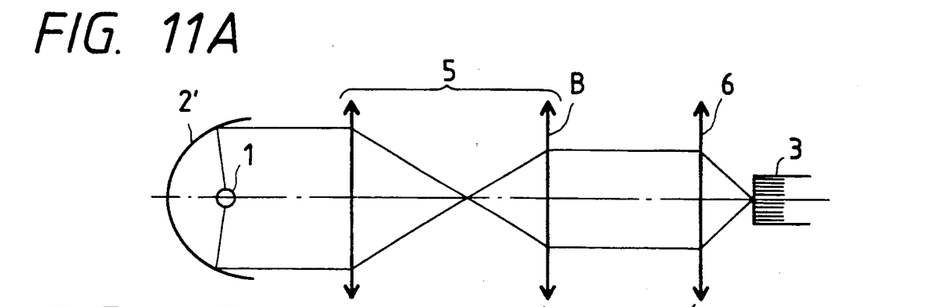
Figure 11B:
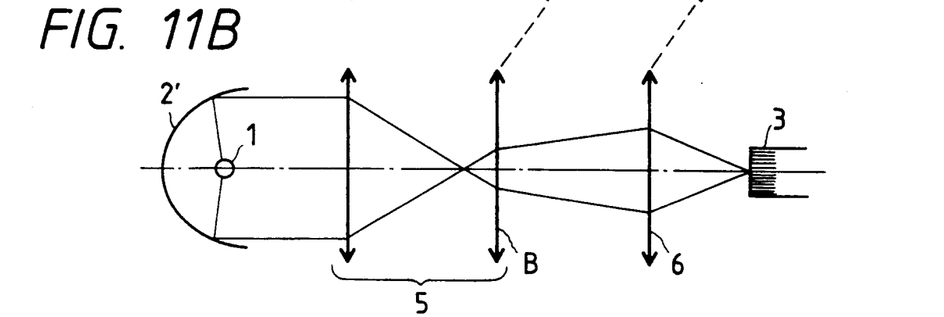

The light source optical system shown in FIG. 11A and FIG. 11B are adapted so as to have two focal points by moving a rear lens unit B of the first optical system 5 and the second optical system 6 along the optical axis with the airspace reserved therebetween kept unchanged. When the total magnification of the rear lens unit of the first optical system 5 and the second optical system 6 is represented by $\beta_{IIa\ III}$ the location of the light guide 3 is kept unchanged by moving the rear lens unit B of the first optical system 5 and the second optical system 6 so as to change the magnification from $\beta_{IIa\ III}$ to $1/\beta_{IIa\ III}$.

Figure 12:
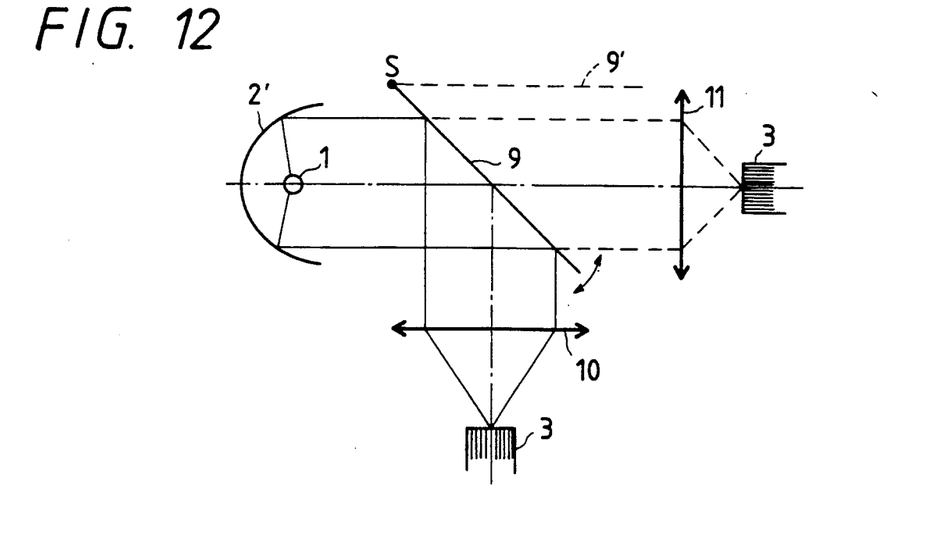

In addition to the zoom optical systems and the optical systems each having two focal lengths described above, the optical system shown in FIG. 12 is usable for varying focal length of the light source optical system. In the optical system shown in FIG. 12, a reflecting member 9 is placed and removed into and out of the optical path so as to change the optical path in two ways, and lenses 10 and 11 having different focal lengths are arranged in the two optical paths respectively. In one of the optical paths, the lens 10 having a long focal length is arranged so that a light bundle having a small NA is incident on the light guide 3. In the other optical path, the lens 11 having a short focal length is arranged so that a light bundle having a large NA is incident on the light guide 3.

Further, focal length of the light source optical system can be varied by arranging a lens having focal length variable by utilizing liquid crystal in the condenser optical system.

Figure 15:
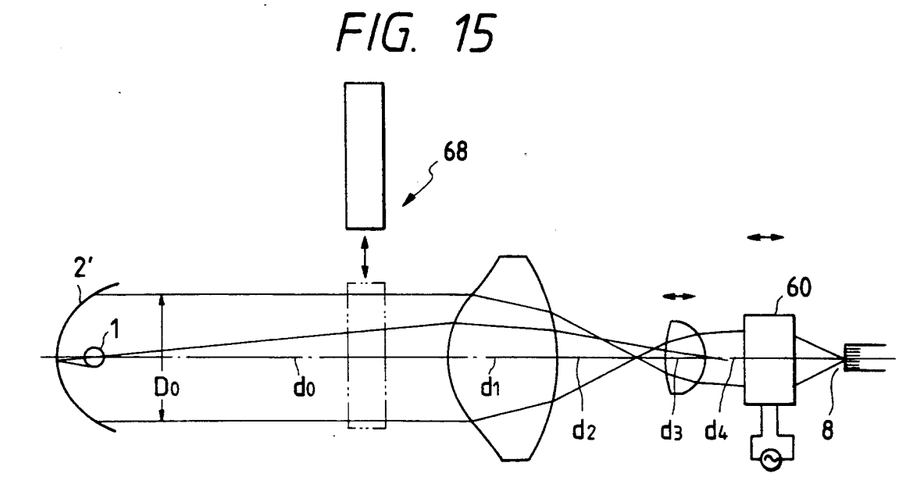
FIG. 15 shows a sectional view illustrating the illumination optical system according to the present invention using a liquid crystal lens having variable focal length.
Figure 16:
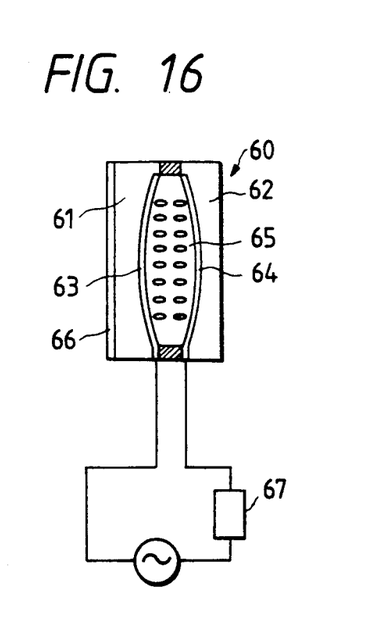
FIG. 16 shows a sectional view illustrating an example of the liquid crystal lens having variable focal length.

The light source optical system illustrated in FIG. 15 uses a lens 60 which has focal length variable by using liquid crystal in place of the two movable lenses ($d_5$ and $d_7$) arranged in the optical system shown in FIG. 13 and is to be described later. FIG. 16 shows an example of lenses each having focal lengths variable by using liquid crystal. In FIG. 16, the reference numerals 61 and 62 represent two base plates which are made of a transparent material such as acrylic resin and arranged opposedly to each other so as to form therebetween an empty chamber having a shape of a lens. The reference numerals 63 and 64 designate transparent electrodes arranged inside the base plates 61 and 62 respectively, the reference numeral 65 denotes a liquid crystal enclosed in the empty chamber, and the reference numeral 66 represents a polarizing plate arranged on the incidence side surface of the transparent base plate 61. Relationship between the polarizing plate 66 and the liquid crystal 65 is set in such a manner that the ray having passed through the polarizing plate 66 is the ordinary ray or the extraordinary ray for the liquid crystal.

When a voltage is applied to the transparent electrodes 63 and 64 from a power source 68 through a resistor element 67 for varying voltage, the liquid crystal molecules change orientation thereof and refractive index of the liquid crystal lens for the ray incident thereon changes from a value corresponding to the ordinary ray to another value corresponding to the extraordinary ray, thereby varying focal length of the liquid crystal lens. It is possible to change angle of incidence, etc. on the light guide by varying the focal length of the liquid crystal lens as described above or obtain the same effect as that available with the light source optical systems described above. However, condensed location of the illumination light is deviated when only the focal length of the liquid crystal lens is varied. In order to correct this deviation, it is sufficient to move the liquid crystal lens 60 proper or the lens $d_3$ along the optical axis.

Figure 17A:
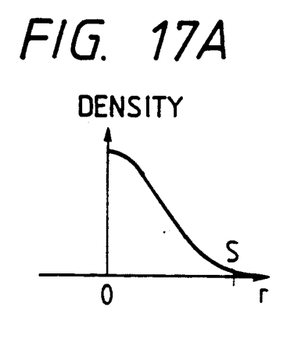
FIG. 17A, FIG. 17B and FIG. 17C show graphs illustrating density curves of unhomogenous ND filters.
Figure 17B:
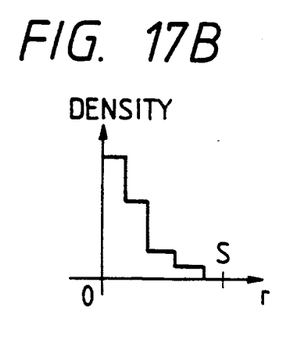
Figure 17C:
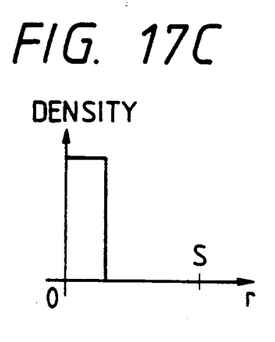

Further, it is possible to vary distribution of the illumination light incident on the light guide by removably arranging an unhomogenous neutral density filter (ND filter) having transmittance varying dependently on the portions thereof in the vicinity of the pupil of the condenser optical system. FIG. 17A, FIG. 17B and FIG. 17C show graphs exemplifying variations of densities of above-mentioned unhomogenous ND filter. In these drawings, the radius of the filter is taken as the abscissa, the density of the filter is taken as the ordinate and the reference symbol S marked on the abscissa represents thickness of the light bundle obtained with the filter placed in the optical path. The ND filter having such a density distribution is set and removed into and out of the location 68 shown in FIG. 15.

Moreover, it is possible to obtain a filter having variable density by combining an ND filter, a liquid crystal element and a polarizing element. It is also possible to vary both focal length and density with a single optical element which is composed of an ND filter and a liquid crystal lens. In addition to the light guide composed of an optical fiber bundle, there is known the liquid light guide, which is composed of an adequate tube filled with a liquid having high optical transparency and a stable chemical property such as silicon oil so that light is transmitted while being totally reflected by the inside wall of the tube. Since this type of light guide has a sectional area of the cladding which is substantially zero relative to the sectional area of the light guide or negligible as compared with the sectional area of the cladding of the light guide composed of an optical fiber bundle, the liquid light guide has a packing fraction (the ratio of area of the portion contributing to transmission of light relative to the sectional area of the light guide) of substantially 1 and has a merit to permit transmitting a large amount of light through a thin guide. However, this type of light guide has a demerit that it cannot have so large a numerical aperture. Accordingly, it is possible to make use of the above-mentioned merit of the liquid light guide so as to transmit light without causing loss of light amount by combining the liquid light guide with the above-described condenser optical system and adjusting the optical system so as to allow a light bundle having a small numerical aperture to be incident on the liquid light guide.

The present invention is useful also to compose a light source device which permits selectively using an endoscope equipped with a light guide composed of an optical fiber bundle and another endoscope which is equipped with a liquid light guide.

DETAILED DESCRIPTION OF THE PREFERRED EMBODIMENTS

Now, the illumination system for endoscopes according to the present invention will be described more detailedly with reference to the preferred embodiments shown in the accompanying drawings and given in the form of the following numerical data:

Embodiment 1
f = 30 (long focal length), 20 (short focal length)

|  | $d_0 = 65.0000$ |  |  |
|---|---|---|---|
| $r_1 = \infty$ (aspherical surface) | $d_1 = 21.0000$ | $n_1 = 1.52307$ | $\nu_1 = 58.49$ |
| $r_2 = -35.8060$ | $d_2 = 19.3000$ |  |  |
| $r_3 = 21.7420$ | $d_3 = 8.0000$ | $n_2 = 1.52307$ | $\nu_2 = 58.49$ |
| $r_4 = \infty$ (aspherical surface) | $d_4 = 7.7624 \sim 1$ |  |  |
| $r_5 = -34.6894$ | $d_5 = 5.0000$ | $n_3 = 1.78472$ | $\nu_3 = 25.71$ |
| $r_6 = -10.8547$ | $d_6 = 2.5524 \sim 11.856$ |  |  |
| $r_7 = 12.0853$ | $d_7 = 5.0000$ | $n_4 = 1.71736$ | $\nu_4 = 29.51$ |
| $r_8 = -23.8600$ | $d_8 = 4.76 \sim 2.22$ |  |  | aspherical coefficient (1st surface)
$B = 0.30397 \times 10^{-1}$, $E = -0.44557 \times 10^{-6}$
$F = -0.81291 \times 10^{-8}$, $G = -0.11544 \times 10^{-9}$
$H = 0.70860 \times 10^{-13}$, $I = 0.89393 \times 10^{-16}$, $P = 0$
(4th surface)
$B = -0.85489 \times 10^{-1}$, $E = 0.19031 \times 10^{-3}$
$F = 0.12990 \times 10^{-5}$, $G = 0.25445 \times 10^{-7}$
$H = -0.17768 \times 10^{-8}$, $I = -0.24388 \times 10^{-10}$, $P = 0$
$D_0 = 12.3 \times 2 = 24.6$
$d_{II}/f_{IIa} + f_{IIb} = 1.0021$, $f_{II\,III\,T}/f_{II\,III\,W} = 1.5$
$(f_{IIb}/f_{IIa} \cdot f_{III})D = 1.2269 \sim 0.8176$
$f_{III} \cdot NA_{LS}/D = 0.1967$, $f_1/f_2 = 2.0437$
$R_2/R_1 = 0.3129$, $R_3/R_4 = -0.5065$

Embodiment 2
f = 30 (long focal length), 20 (short focal length)

|  | $d_0 = 65.0000$ |  |  |
|---|---|---|---|
| $r_1 = \infty$ (aspherical surface) | $d_1 = 21.0000$ | $n_1 = 1.52307$ | $\nu_1 = 58.49$ |
| $r_2 = -35.8060$ | $d_2 = 19.3000$ |  |  |
| $r_3 = 21.7420$ | $d_3 = 8.0000$ | $n_2 = 1.52307$ | $\nu_2 = 58.49$ |
| $r_4 = \infty$ (aspherical surface) | $d_4 = 7.7624 \sim 1$ |  |  |
| $r_5 = -36.6277$ | $d_5 = 5.0000$ | $n_3 = 1.78472$ | $\nu_3 = 25.71$ |
| $r_6 = -10.9919$ | $d_6 = 2.5524 \sim 11.856$ |  |  |
| $r_7 = 13.1350$ | $d_7 = 5.0000$ | $n_4 = 1.78472$ | $\nu_4 = 25.71$ |
| $r_8 = -26.6852$ | $d_8 = 4.82 \sim 2.28$ |  |  | aspherical coefficient (1st surface)
$B = 0.30397 \times 10^{-1}$, $E = -0.44557 \times 10^{-6}$
$F = -0.81291 \times 10^{-8}$, $G = -0.11544 \times 10^{-9}$
$H = 0.70860 \times 10^{-13}$, $I = 0.89393 \times 10^{-16}$, $P = 0$
(4th surface)
$B = -0.85489 \times 10^{-1}$, $E = 0.19031 \times 10^{-3}$
$F = 0.12990 \times 10^{-5}$, $G = 0.25445 \times 10^{-7}$
$H = -0.17768 \times 10^{-8}$, $I = -0.24388 \times 10^{-10}$, $P = 0$
$D_0 = 12.3 \times 2 = 24.6$
$d_{II}/f_{IIa} + f_{IIb} = 1.0021$, $f_{II\,III\,T}/f_{II\,III\,W} = 1.5$
$(f_{IIb}/f_{IIa} \cdot f_{III})D = 1.2269 \sim 0.8175$
$f_{III} \cdot NA_{LS}/D = 0.1967$, $f_1/f_2 = 2.0437$
$R_2/R_1 = 0.3001$, $R_3/R_4 = -0.4922$

Embodiment 3
f = 30 (long focal length), 20 (short focal length)

|  | $d_0 = 65.0000$ |  |  |
|---|---|---|---|
| $r_1 = \infty$ (aspherical surface) | $d_1 = 21.0000$ | $n_1 = 1.52307$ | $\nu_1 = 58.49$ |
| $r_2 = -35.8060$ | $d_2 = 19.3000$ |  |  |
| $r_3 = 21.7420$ | $d_3 = 8.0000$ | $n_2 = 1.52307$ | $\nu_2 = 58.49$ |
| $r_4 = \infty$ (aspherical surface) | $d_4 = 7.7625 \sim 1$ |  |  |
| $r_5 = -31.2562$ | $d_5 = 5.0000$ | $n_3 = 1.78472$ | $\nu_3 = 25.71$ |
| $r_6 = -10.5834$ | $d_6 = 2.5524 \sim 11.855$ |  |  |
| $r_7 = 13.8480$ | $d_7 = 5.0000$ | $n_4 = 1.76182$ | $\nu_4 = 26.55$ |
| $r_8 = -22.0023$ | $d_8 = 4.96 \sim 2.42$ |  |  | aspherical coefficient (1st surface)
$B = 0.30397 \times 10^{-1}$, $E = -0.44557 \times 10^{-6}$
$F = -0.81291 \times 10^{-8}$, $G = -0.11544 \times 10^{-9}$
$H = 0.70860 \times 10^{-13}$, $I = 0.89393 \times 10^{-16}$, $P = 0$
(4th surface)
$B = -0.85489 \times 10^{-1}$, $E = 0.19031 \times 10^{-3}$
$F = 0.12990 \times 10^{-5}$, $G = 0.25445 \times 10^{-7}$
$H = -0.17768 \times 10^{-8}$, $I = -0.24388 \times 10^{-10}$, $P = 0$
$D_0 = 12.3 \times 2 = 24.6$
$d_{II}/f_{IIa} + f_{IIb} = 1.0021$, $f_{II\,III\,T}/f_{II\,III\,W} = 1.5$
$(f_{IIb}/f_{IIa} \cdot f_{III})D = 1.2270 \sim 0.8176$
$f_{III} \cdot NA_{LS}/D = 0.1967$, $f_1/f_2 = 2.0437$
$R_2/R_1 = 0.3386$, $R_3/R_4 = -0.6294$

Embodiment 4
f = 30 (long focal length), 20 (short focal length)

|  | $d_0 = 65.0000$ |  |  |
|---|---|---|---|
| $r_1 = \infty$ (aspherical surface) | $d_1 = 21.0000$ | $n_1 = 1.52307$ | $\nu_1 = 58.49$ |
| $r_2 = -35.8060$ | $d_2 = 19.3000$ |  |  |
| $r_3 = 21.7420$ | $d_3 = 8.0000$ | $n_2 = 1.52307$ | $\nu_2 = 58.49$ |
| $r_4 = \infty$ (aspherical surface) | $d_4 = 7.7624 \sim 1$ |  |  |
| $r_5 = -39.8208$ | $d_5 = 5.0000$ | $n_3 = 1.88300$ | $\nu_3 = 40.78$ |
| $r_6 = -12.2350$ | $d_6 = 2.5524 \sim 11.856$ |  |  |
| $r_7 = 15.0872$ | $d_7 = 5.0000$ | $n_4 = 1.88300$ | $\nu_4 = 40.78$ |
| $r_8 = -29.0180$ | $d_8 = 4.97 \sim 2.42$ |  |  | aspherical coefficient (1st surface)
$B = 0.30397 \times 10^{-1}$, $E = -0.44557 \times 10^{-6}$
$F = -0.81291 \times 10^{-8}$, $G = -0.11544 \times 10^{-9}$
$H = 0.70860 \times 10^{-13}$, $I = 0.89393 \times 10^{-16}$, $P = 0$
(4th surface)
$B = -0.85489 \times 10^{-1}$, $E = 0.19031 \times 10^{-3}$
$F = 0.12990 \times 10^{-5}$, $G = 0.25445 \times 10^{-7}$
$H = -0.17768 \times 10^{-8}$, $I = -0.24388 \times 10^{-10}$, $P = 0$
$D_0 = 12.3 \times 2 = 24.6$
$d_{II}/f_{IIa} + f_{IIb} = 1.0021$, $f_{II\,III\,T}/f_{II\,III\,W} = 1.5$
$(f_{IIb}/f_{IIa} \cdot f_{III})D = 1.2268 \sim 0.8174$
$f_{III} \cdot NA_{LS}/D = 0.1967$, $f_1/f_2 = 2.0437$
$R_2/R_1 = 0.3073$, $R_3/R_4 = -0.5199$

Embodiment 5
f = 30 (long focal length), 20 (short focal length)

|  | $d_0 = 65.0000$ |  |  |
|---|---|---|---|
| $r_1 = \infty$ (aspherical surface) | $d_1 = 21.0000$ | $n_1 = 1.52307$ | $\nu_1 = 58.49$ |
| $r_2 = -35.8060$ | $d_2 = 23.2462$ |  |  |
| $r_3 = -87.7520$ | $d_3 = 8.5000$ | $n_2 = 1.78472$ | $\nu_2 = 25.71$ |
| $r_4 = -12.9631$ | $d_4 = 0.5000$ |  |  |
| $r_5 = 25.5117$ | $d_5 = 5.0000$ | $n_3 = 1.78472$ | $\nu_3 = 25.71$ |
| $r_6 = -72.7837$ | $d_6 = 2.5368 \sim 8.756$ |  |  |
| $r_7 = -17.8771$ | $d_7 = 2.0000$ | $n_4 = 1.78472$ | $\nu_4 = 25.71$ |
| $r_8 = 37.4876$ | $d_8 = 6.7563 \sim 0.537$ |  |  |
| $r_9 = 23.9643$ | $d_9 = 7.0000$ | $n_5 = 1.78472$ | $\nu_5 = 25.71$ |
| $r_{10} = -45.5117$ | $d_{10} = 0.1000$ |  |  |
| $r_{11} = 14.3629$ | $d_{11} = 6.0000$ | $n_6 = 1.78472$ | $\nu_6 = 25.71$ |
| $r_{12} = -231.5060$ (aspherical surface) | $d_{12} = 9.44$ |  |  | aspherical coefficient (1st surface)

-continued

Embodiment 5
f = 30 (long focal length), 20 (short focal length)

$B = 0.30397 \times 10^{-1}$,     $E = -0.44557 \times 10^{-6}$
$F = -0.81291 \times 10^{-8}$,    $G = -0.11544 \times 10^{-9}$
$H = 0.70860 \times 10^{-13}$,    $I = 0.89393 \times 10^{-16}$,    $P = 0$
(11st surface)
$E = -0.11635 \times 10^{-3}$,    $F = 0.13621 \times 10^{-7}$
$G = -0.23693 \times 10^{-11}$,   $H = -0.75056 \times 10^{-15}$,   $P = 1$
$D_0 = 24.6$
$d_{II}/f_{IIa} + f_{IIb} = 1.0021$,         $f_{II\ III\ T}/f_{II\ III\ W} = 1.5$
$(f_{IIb}/f_{IIa} \cdot f_{III})D = 0.7479 \sim 0.53407$
$f_{III} \cdot NA_{LS}/D = 0.3227$,          $|r_{min}/f_{33}| = 1.39$
$f_{33}'/f_{33}'' = 1.578$ wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, the reference symbols $v_1, v_2, \ldots$ represent the Abbe's numbers of the respective lens elements, and the reference symbol f designates the focal length of the illumination system as a whole. In addition, the reference symbol $d_0$ represents the distance as measured from the light source to the first lens surface, the reference symbol $d_8$ used in Embodiments 1 through 4 or the reference symbol $d_{11}$ used in an Embodiment 5 designates the distance as measured from the final surface of the illumination system to the end surface of incidence of the light guide, and the reference symbol $D_0$ denotes the diameter of the light bundle reflected by the reflecting mirror.

Figure 13:
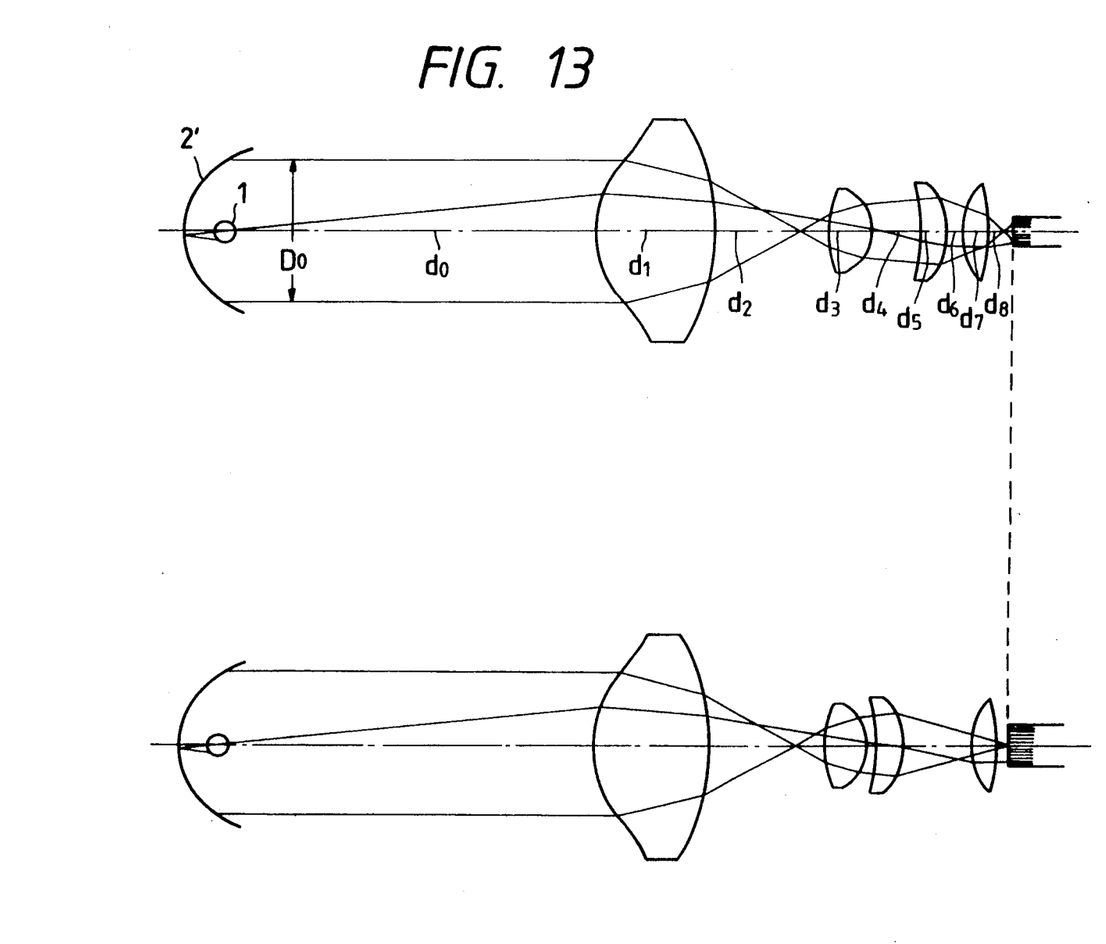
FIG. 13 and FIG. 14 show sectional views illustrating preferred embodiments of the illumination system for endoscopes according to the present invention.

The Embodiments 1 through 4 have the composition shown in FIG. 13 wherein a zoom optical system composed of two lens units is adopted.

In order that little aberrations are to be produced by moving the second optical system for varying the focal length of the illumination system in these embodiments, it is desirable to design the second optical system so as to satisfy the following conditions (5) and (6):

(5) $0.1 < R_2/R_1 < 0.5$ (6) $-0.8 < R_3/R_4 < -0.3$ wherein the reference symbols $R_1$ and $R_2$ represent the radii of curvature on both the surfaces of the lens component arranged on the side of the light source in the second optical system, the reference symbols $R_3$ and $R_4$ designate the radii of curvature on both the surfaces of the lens component arranged on the side of the light guide in the second optical system.

Out of the lens components used for composing the second optical system, the one arranged on the side of the light source is designed as a meniscus lens component having a concave surface on the side of the light source and satisfying the condition (5). If the upper limit or the lower limit of the condition (5) is exceeded, coma will be produced remarkably and the NA symmetry will be degraded in the vicinity of the outermost marginal portion of the glowing bright spot, thereby degrading light distribution characteristic.

Further, the lens component arranged on the side of the light guide in the second optical system is designed as a biconvex lens component having a surface with a large radius of curvature on the side of the light guide and satisfying the condition (6). If the upper limit or the lower limit of the condition (6) is exceeded, the final surface of the condenser optical system will have too strong a refractive power, thereby undesirably causing loss of light amount due to total reflection on the final surface.

Furthermore, a risk of breakage due to collision will be produced when the final surface of the condenser optical system is too close to the light guide. In order to prevent such a risk, it is necessary to design the second optical system so as to satisfy the following condition (7):

(7) $1.5 < f_1/f_2 < 2.5$ wherein the reference symbols $f_1$ and $f_2$ represent the focal lengths of the lens components arranged on the sides of the light source and the light guide respectively in the second optical system.

If the upper limit of the condition (7) is exceeded, the second optical system will undesirably have too large a total length. If the lower limit of the condition (7) is exceeded, the final surface of the condenser optical system will be too close to the light guide, thereby producing a high possibility of breakage.

Figure 14:
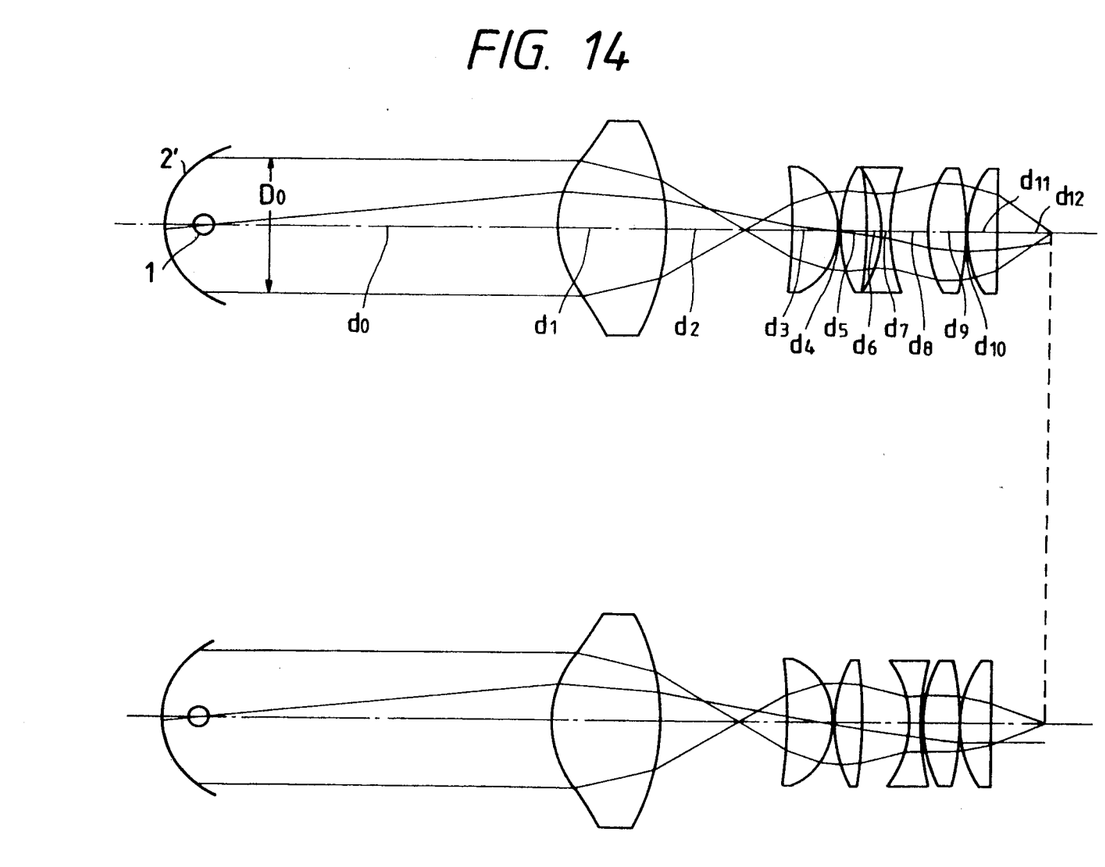

The Embodiment 5 has the composition shown in FIG. 14 and adopts a lens system which has two focal lengths, and consists of a first lens unit, a second lens unit and a third lens units.

The Embodiment 5 comprises a concave lens component arranged in the second optical system, as well as positive lens components which are arranged before and after the concave lens component and have strong refractive powers for preventing the illumination optical system as a whole from having a focal length longer than required. Since total reflection is to be produced especially when the convex lens component arranged on the side of the light guide has a strong refractive power, this convex lens component is divided into two lens elements for sharing the refractive power among the surfaces thereof, thereby preventing the total reflection from being caused. The convex lens elements are designed so as to satisfy the following conditions (8) and (9):

(8) $|r_{min}/f_{33}| > 1$ (9) $0.1 < f_{33}'/f_{33}''10$ wherein the reference symbol $r_{min}$ represents the radius of curvature which is the minimum among those of the surfaces of the two convex lens elements arranged on the side of the light guide in the second optical system, the reference symbol $f_{33}$ designates the total focal length of said two lens elements, and the reference symbols $f_{33}'$ and $f_{33}''$ denote the focal lengths of the convex lens element arranged on the side of the light source and the convex lens element arranged on the side of the light guide respectively.

If the condition (8) is not satisfied, the total reflection will be caused, thereby increasing loss of light amount. If the upper limit or the lower limit of the condition (9) is exceeded, one of the convex lens elements will have too strong a refractive power and the total reflection will easily be caused.

The shapes of the aspherical surfaces used in the Embodiments of the present invention described above are expressed by the following formula:

$$x = \frac{y^2/r}{1 + \sqrt{1 - p(y/r)^2}} + By^2 + Ey^4 + Fy^6 + Gy^8 + Hy^{10} + Iy^{12}$$

wherein the optical axis is taken as the x axis, the direction perpendicular to the optical axis is taken as the y axis, the reference symbol p represents the conical coefficient, and the reference symbols B, E, F, G, H, I, ... designate the aspherical surface coefficients.

As is understood from the foregoing description, the illumination system according to the present invention permits changing NA and diameter of an incident light bundle so as to be optimum for an endoscope which is selected for use from among endoscopes equipped with light guides having different NA's and sectional areas, thereby making it possible to enhance efficiency of light transmission through the light guide and increase amount of light emerging from the light guide.

What is claimed is:

1. An illumination system for endoscopes, comprising:
   a light source,
   a reflector for reflecting a portion of light emitted from said light source,
   a condenser optical system for focusing the light emitted from said light source and the portion of light reflected by said reflector onto a predetermined location, and
   a plurality of light guides having numerical apertures different from one another and functioning selectively to receive the light focused by said condenser optical system,
   wherein said condenser optical system including a means for changing numerical aperture of a light beam incident from said condenser optical system onto each of said light guides in conjunction with the numerical aperture of each of said light guides.

2. An illumination system for endoscopes according to claim 1 wherein the numerical aperture $NA_{LG}$ of each of said light guides is within the range defined below:

$$0.4 \leq NA_{LG} < 1$$

and numerical aperture $NA_{LS}$ of the light bundle emerging from said condenser optical system varies within the range satisfying the following condition:

$$0.6 \leq NA_{LS}/NA_{LG} \leq 1.5$$

3. An illumination system for endoscopes according to claim 1 wherein said condenser optical system comprises a lens having variable focal length and satisfies the following conditions:

$f_T/f_W \geq 1.1$
$0.4 \leq D/f_S \leq 1.0$ wherein the reference symbols $f_T$ and $f_W$ represent the focal lengths of the lens having variable focal length at the long focal length position and the short focal length position thereof respectively, the reference symbol $f_S$ designates the focal length of said lens at an optional intermediate position between said long focal length position and said short focal length position, and the reference symbol D denotes the diameter of the light bundle incident on said condenser optical system.

4. An illumination system for endoscopes according to claim 1 wherein said condenser optical system comprises, in the order from the light source side, a first optical system composed of a front lens unit having a positive refractive power and a rear lens unit having a positive refractive power, and a second optical system for focusing the light emerging from said first optical system onto the surface of incidence of the optical fiber bundle of said light guide.

5. An illumination system for endoscopes according to claim 1 wherein the distance as measured from said light source to the surface of incidence of said light guide is always kept substantially constant.

6. An illumination system for endoscopes according to claim 4 or 5 wherein said condenser optical system satisfies the following conditions:

(1) $0.8 \leq d_{II}/(f_{IIa}+f_{IIb}) \leq 1.2$
(2) $f_{II\ III\ T} \geq 1.1$
(3) $0.8 \leq (f_{IIb}/f_{IIa} \cdot f_{III}) \cdot D' < 2$
(4) $f_{III} \cdot NA_{LS}/D' \leq 0.5$ wherein the reference symbol $d_{II}$ represents the distance between the principal point of said front lens unit and that of said rear lens unit, the reference symbol $f_{IIa}$ designates the focal length of said front lens unit, the reference symbol $f_{IIb}$ designates the focal length of said rear lens unit, the reference symbol $f_{II\ III\ T}$ denotes the total focal length of said first optical system and said second optical system at the long focal length position thereof, the reference symbol $f_{II\ III\ W}$ represents the total focal length of said first optical system and said second optical system set at the short focal length position thereof, the reference symbol $D'$ represents the diameter of the light bundle emerging from said condenser optical system, and the reference symbol $f_{III}$ designates the focal length of said second optical system.

7. An illumination system for endoscopes according to claim 4 or 5 wherein a stop having a variable aperture is arranged between said pair of positive lens units at a location where the light emitted from said light source is focused.

8. An illumination system for endoscopes according to claim 6 wherein said second optical system is composed of two lens units freely movable along the optical axis and having positive refractive powers, and satisfies the following conditions:

(5) $0.1 < R_2R_1 < 0.5$
(6) $-0.8 < R_3/R_4 < -0.3$ wherein the reference symbols $R_1$ and $R_2$ represent the radii of curvature on both the surfaces of the lens unit arranged on the side of the light source in the second optical system, and the reference symbols $R_3$ and $R_4$ designate the radii of curvature on both the surfaces of the lens unit arranged on the side of the light guide in the second optical system.

9. An illumination system for endoscopes according to claim 8 satisfying the following condition:

(7) $1.5 < f_1/f_2 < 2.5$ wherein the reference symbols $f_1$ and $f_2$ represent the focal lengths of the lens units arranged on the sides of the light source and the light guide respectively in the second optical system.

10. An illumination system for endoscopes according to claim 6 wherein said second optical system comprises, in the order from the side of incidence, a first lens unit having a positive refractive power, a second lens unit freely movable along the optical axis and having a negative refractive power, and a third lens unit composed of a plurality of lens elements and having a positive refractive power, and satisfies the following conditions:

(8) $|r_{min}/f_{33}| > 1$
(9) $0.1 < f_{33}'/f_{33}'' 10$ wherein the reference symbol $r_{min}$ represents the radius of curvature on the surface having the strongest refractive power among the surfaces of the lens elements composing the third lens unit, and the reference symbols $f_{33}'$ and $f_{33}''$ designate the focal lengths of the lens element arranged at the most light source side position and the lens element arranged at the most light guide side position in the third lens unit respectively.

11. An illumination system for endoscopes according to claim 6 wherein the rear lens unit of said first optical system and said second optical system are moved integrally along the optical axis.

12. An illumination system for endoscopes according to claim 6 wherein the composite optical system consisting of the front lens unit of said first optical system and the rear lens unit of said second optical system is reversible taking a definite point on the optical axis as the rotating center, and the magnification of said composite optical system is set at the level equal to the reverse number of the original magnification.

13. An illumination system for endoscopes according to claim 1, 4 or 5 wherein a single or plurality of lens units out of said lens units composing said condenser optical system are removably arranged on the optical path.

14. An illumination system for endoscopes according to claim 1, 4 or 5 wherein a plurality of lens units having magnifications different from one another are arranged selectively and removably in the optical path of said condenser optical system.

15. An illumination optical system for endoscopes according to claim 14 wherein said removably arranged lens units compose a substantially afocal system.

16. An illumination system for endoscopes according to claim 1 or 3 wherein an unhomogenous density filter is removably arranged in the vicinity of the pupil of said condenser optical system.

17. An illumination system for endoscopes according to claim 1 or 3 wherein said condenser optical system comprises a liquid crystal lens having variable focal length.

18. An illumination system for endoscopes according to claim 1 wherein said light source emits a light bundle substantially parallel with the optical axis, and said condenser optical system comprises, in the order from the side of incidence, a first lens unit having a positive refractive power, a second lens unit freely movable along the optical axis and having a negative refractive power, and a third lens unit having a positive refractive power.

19. An illumination system for endoscopes according to claim 1 wherein said condenser optical system is equipped with an optical path changing means capable of leading the light emitted from said light source selectively into a plurality of optical paths having different directions, lenses having different focal lengths are disposed in said plurality of optical paths, a light guide is arranged on the side of emergence from each of said lenses, and the light emitted from said light source is led into any one of the light guides by switching said optical path changing means.

20. An illumination system for endoscopes comprising:
a light source,
a reflector for reflecting a portion of light emitted from said light source, and
a condenser optical system for focusing the light emitted from said light source and the portion of light reflected by said reflector onto a predetermined location, and
a plurality of light guides for selectively receiving the light focused by said condenser optical system,
said condenser optical system including a means for changing numerical aperture of a light beam incident from said condenser optical system onto each of said light guides in conjunction with the numerical aperture of each of the light guides.

21. An illumination system for endoscopes according to claim 1 wherein at least one of said plurality of light guides is a liquid guide.

22. An illumination system for endoscopes comprising:
a light source,
a reflector for reflecting a portion of light emitted from said light source, and
a condenser optical system for focusing the light emitted from said light source and the portion of light reflected by said reflector,
wherein said condenser optical system includes a plurality of lens components, at least one of the lens components being freely movable along the optical axis, and
wherein a numerical aperture of a light beam emerging from said condenser optical system is variable by moving said lens component along the optical axis.

23. A light source device for endoscopes comprising a light source and a condenser optical system for focusing the light emitted from said light source onto a predetermined location, said condenser optical system comprising a plurality of lens components, at least one of said lens components being removable arranged in the optical path, and said light source device being adapted in such a manner than numerical aperture of the light bundle emerging from said condenser optical system can be varied by putting and removing said lens component into and out of the optical path.

24. An illumination system device for endoscopes comprising:
a light source,
a reflector for reflecting a portion of light emitted from said light source, and
a condenser optical system for focusing the light emitted from said light source and the portion of light reflected by said reflector,
wherein said condenser optical system includes a plurality of lens components, at least one of said lens components being disposed so as to have a location variable on the optical axis, and
wherein a numerical aperture of a light beam emerging from said condenser optical system is variable by changing a position of said at least one lens component.

* * * * *